United States Patent
Ivanovic et al.

(10) Patent No.: US 12,039,438 B2
(45) Date of Patent: Jul. 16, 2024

(54) SYSTEMS AND METHODS FOR TRAJECTORY FORECASTING ACCORDING TO SEMANTIC CATEGORY UNCERTAINTY

(71) Applicant: Toyota Research Institute, Inc., Los Altos, CA (US)

(72) Inventors: Boris Ivanovic, Stanford, CA (US); Kuan-Hui Lee, San Jose, CA (US); Jie Li, Los Altos, CA (US); Adrien David Gaidon, Mountain View, CA (US); Pavel Tokmakov, San Franciso, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 464 days.

(21) Appl. No.: 17/112,292

(22) Filed: Dec. 4, 2020

(65) Prior Publication Data

US 2022/0180170 A1    Jun. 9, 2022

(51) Int. Cl.
*G06N 3/00*     (2023.01)
*B60W 30/095*   (2012.01)
(Continued)

(52) U.S. Cl.
CPC .......... *G06N 3/08* (2013.01); *B60W 30/0956* (2013.01); *G06N 3/044* (2023.01);
(Continued)

(58) Field of Classification Search
CPC ..................... G06T 7/143; G06T 7/246; G06T 2207/10016; G06T 2207/20076;
(Continued)

(56) References Cited

U.S. PATENT DOCUMENTS 10,599,161 B2    3/2020  Kennedy et al.
11,433,922 B1 *  9/2022  Van Heukelom ..........................
                                            B60W 60/00272
(Continued)

FOREIGN PATENT DOCUMENTS

DE    102018128398 B3 * 12/2019    ............ B60W 30/00

OTHER PUBLICATIONS

A. Wang, "Pedestrian Trajectory Prediction with Graph Neural Networks", 2019 (Year: 2019).*
(Continued)

*Primary Examiner* — Elaine Gort
*Assistant Examiner* — Brittany Renee Peko
(74) *Attorney, Agent, or Firm* — Christopher G. Darrow; Darrow Mustafa PC (57) ABSTRACT

Systems, methods, and other embodiments described herein relate to improving trajectory forecasting in a device. In one embodiment, a method includes, in response to receiving sensor data about a surrounding environment of the device, identifying an object from the sensor data that is present in the surrounding environment. The method includes determining category probabilities for the object, the category probabilities indicating semantic classes for classifying the object and probabilities that the object belongs to the semantic classes. The method includes forecasting trajectories for the object based, at least in part, on the category probabilities and the sensor data. The method includes controlling the device according to the trajectories.

20 Claims, 6 Drawing Sheets

(51) Int. Cl.
    *G06N 3/044*     (2023.01)
    *G06N 3/08*     (2023.01)
    *B60W 60/00*     (2020.01)
    *G05D 1/00*     (2006.01)

(52) U.S. Cl.
    CPC . *B60W 60/0027* (2020.02); *B60W 2554/4044* (2020.02); *G05D 1/0214* (2013.01)

(58) Field of Classification Search
    CPC . G06T 2207/20081; G06T 2207/20084; G06T 2207/30261
    See application file for complete search history.

(56) References Cited

U.S. PATENT DOCUMENTS

| | | | | |
|---|---|---|---|---|
| 11,562,490 | B2* | 1/2023 | Homayounfar | G06T 7/11 |
| 2013/0197736 | A1* | 8/2013 | Zhu | G05D 1/00 |
| | | | | 701/26 |
| 2019/0094867 | A1 | 3/2019 | Vernaza et al. | |
| 2020/0004259 | A1* | 1/2020 | Gulino | G05D 1/0221 |
| 2020/0160059 | A1 | 5/2020 | Choi | |
| 2020/0264609 | A1 | 8/2020 | Hammond et al. | |
| 2021/0070322 | A1* | 3/2021 | Noy | B60W 60/0027 |
| 2022/0129685 | A1* | 4/2022 | Gummadi | G06K 9/00805 |

OTHER PUBLICATIONS

J. Kooij, "Context-Based Path Prediction for Targets with Switching Dynamics", 2017 (Year: 2017).*
E. Pool, "Context-based cyclist path prediction using Recurrent Neural Networks", 2019 (Year: 2019).*
Xiong, H., Pandey, G., Steinbach, M., & Kumar, V. (2006). Enhancing data analysis with noise removal. IEEE transactions on knowledge and data engineering, 18(3), 304-319. (Year: 2006).*
Hu, Yeping & Zhan, Wei & Tomizuka, Masayoshi. (2020). Scenario-Transferable Semantic Graph Reasoning for Interaction-Aware Probabilistic Prediction. (Year: 2020).*
Salzmann et al., "Trajectron++ Dynamically-Feasible Trajectory Forecasting With Heterogeneous Data", found at: arXiv:2001.03093v3 [cs.RO] Jun. 1, 2020.
Weng et al., "End-to-End 3D multi-Object Tracking and Trajectory Forecasting", found at: arXiv:2008.11598v1 [cs.CV] Aug. 25, 2020.
Rhinehart et al., "PRECOG PREdiction Conditioned On Goals in Visual Multi-Agent Settings", found at: arXiv:1905.01296v3 [cs. CV] Sep. 30, 2019.
Sadat et al., "Perceive, Predict, and Plan Safe Motion Planning Through Interpretable Semantic Representations", found at: arXiv:2008.05930v1 [cs.RO] Aug. 13, 2020.
Terwilliger et al. "Recurrent Flow-Guided Semantic Forecasting", found at: arXiv:1809.08318v2 [cs.CV] Nov. 21, 2018.
Luo et al. "Probabilistic Multi-modal Trajectory Prediction with Lane Attention for Autonomous vehicles", found at: arXiv:2007.02574v1 [cs.RO] Jul. 6, 2020.
Loukkal et al. "Driving among Flatmobiles Bird-Eye-View occupancy grids from a monocular camera for holistic trajectory planning", found at: arXiv:2008.04047v1 [cs.CV] Aug. 10, 2020.
Dwivedi et al. "SSP Single Shot Future Trajectory Prediction", found at: arXiv:2004.05846v1 [cs.CV] Apr. 13, 2020.
Dulian et al. "Physically constrained short-term vehicle trajectory forecasting with naive semantic maps", found at: arXiv:2006.05159v1 [cs.CV] Jun. 9, 2020.
Helbing et al., "Social force model for pedestrian dynamics", Physical Review E51(5), 4282-4286 (1995).
Wang et al., "Gaussian process dynamical models for human motion" IEEE Transactions On Pattern Analysis and Machine Intelligence, vol. 30, No. 2, Feb. 2008.
Lee at al., "Predicting wide receiver trajectories in American football" In: IEEE Winter Conf. on Applications of Computer Vision (2016).
Alahi et al., "Social LSTM: Human trajectory prediction in crowded spaces", In: IEEE Conf. on Computer Vision and Pattern Recognition (2016).
Morton et al., "Analysis of recurrent neural networks for probabilistic modeling of driver behavior", IEEE Transactions on Pattern Analysis & Machine Intelligence 18(5), 1289-1298 (2017).
Vemula et al., "Social attention: Modeling attention in human crowds", found at: arXiv:1710.04689v2 [cs.RO] Oct. 29, 2018.
Sohn et al., "Learning structured output representation using deep conditional generative models", In: Conf. on Neural Information Processing Systems (2015).
Goodfellow et al., "Generative adversarial nets", In: Conf. on Neural Information Processing Systems (2014).
Lee et al., "DESIRE: distant future prediction in dynamic scenes with interacting agents", found at: arXiv:1704.04394v1 [cs.CV] Apr. 14, 2017.
Ivanovic et al., "Generative modeling of multimodal multi-human behavior", found at: arXiv:1803.02015v2 [cs.RO] Jul. 26, 2018.
Deo et al., "Multi-modal trajectory prediction of surrounding vehicles with maneuver based lstms" found at: arXiv:1805.05499v1 [cs.CV] May 15, 2018.
Sadeghian et al. "CAR-Net: Clairvoyant attentive recurrent network" found at: arXiv:1711.10061v2 [cs.CV] Mar. 27, 2018.
Ivanovic "Probabilistic multi-agent trajectory modeling with dynamic spatiotemporal graphs" In: IEEE Int. Conf. on Computer Vision. pp. 2375-2384 (2019).
Gupta et al., "Social GAN: Socially acceptable trajectories with generative adversarial networks" found at: arXiv:1803.10892v1 [cs.CV] Mar. 29, 2018.
Sadeghian et al., "SoPhie: An attentive GAN for predicting paths compliant to social and physical constraints", found at: arXiv:1806.01482v2 [cs.CV] Sep. 20, 2018.
Kosaraju et al., "S.: Social-BiGAT: Multimodal trajectory forecasting using bicycle-GAN and graph attention networks", found at: arXiv:1907.03395v2 [cs.CV] Jul. 17, 2019.
Zhao et al., "Multiagent tensor fusion for contextual trajectory prediction", found at: arXiv:1904.04776v2 [cs.CV] Jul. 28, 2019.
Zeng et al., "End-to-end interpretable neural motion planner", fProceedings of the IEEE/CVF Conference on Computer Vision and Pattern Recognition (CVPR), 2019, pp. 8660-8669.
Casas et al., "IntentNet: Learning to predict intention from raw sensor data", In: Conf. on Robot Learning. pp. 947-956 (2018).
Jain et al., "Discrete residual flow for probabilistic pedestrian behavior prediction", found at: arXiv:1910.08041v1 [cs. CV] Oct. 17, 2019.
Casas et al.,"SpAGNN: Spatially-aware graph neural networks for relational behavior forecasting from sensor data" found at: arXiv:1910.08233v1 [cs.CV] Oct. 18, 2019.

* cited by examiner

SYSTEMS AND METHODS FOR TRAJECTORY FORECASTING ACCORDING TO SEMANTIC CATEGORY UNCERTAINTY

TECHNICAL FIELD

The subject matter described herein relates, in general, to systems and methods for forecasting trajectories of objects and, more particularly, to forecasting trajectories of objects according to a set of identified classes for the objects to account for uncertainty in classifications.

BACKGROUND

Various devices (e.g., robots, autonomous vehicles, etc.) that provide information about a surrounding environment use sensors to perceive obstacles and other aspects of the surrounding environment. For example, a robotic device may use information from the sensors to forecast trajectories of various objects in the surrounding environment. In particular, the robotic device may use the perceived information to classify the objects according to a known class (e.g., vehicle, pedestrian, etc.) that most closely corresponds with the object. That is, the robotic device may not know with absolute certainty the class of the object, but uses a hard decision to accept whichever class the robotic device determines has a highest correspondence. Thus, while the device assigns a particular class to the object, the class may not be accurate.

Further, the robotic device may predict a trajectory or other aspects associated with the objects. In various approaches, to accurately predict this additional information, the device may base the prediction on the class. For example, the device may predict a trajectory, including likely accelerations, movements, etc., according to common attributes of trajectories for other objects of the same class. However, as noted, the determination of the class may be inaccurate. Consequently, the device may not accurately derive a trajectory or other information about an object for which the classification is inaccurate. As a result, the device may not have adequate time to avoid a collision or may need to take evasive maneuvers that could otherwise be avoided.

SUMMARY

Example systems and methods relate to an improved approach to forecasting trajectories for a detected object having an uncertain semantic class are disclosed. As previously noted, accurately representing objects detected in a surrounding environment can be a difficult task. For example, a classification may be based on whichever class within a defined ontology most closely corresponds to an object. This determination may depend on one of the classes, indicating a probability of correspondence that satisfies a threshold value. However, this form of hard coding for a semantic class can, at times, result in incorrectly classifying an object when, for example, multiple separate semantic classes indicate probabilities of correspondence. That is, when a device analyzes the sensor data to identify and classify an object, the result is generally a set of probabilities that indicate how closely the object corresponds with different semantic classes (e.g., bike, moving car, motorcycle, truck, parked car, etc.). In various circumstances, the confidence of the detection/classification may be lower due to various environmental circumstances (e.g., rain, fog, etc.), poor observation (e.g., partially occluded), and so on. In any case, multiple separate categories for the semantic classes may indicate similar probabilities. In a hard decision approach, the device may simply accept the semantic class with the highest probability as the class of the object. Yet, as noted, this can lead to inaccurate forecasts of a trajectory for the object that may result in the device not being able to adequately plan for likely movements of the object.

Therefore, in one embodiment, an observation system is disclosed that improves the trajectory forecasting for objects by accounting for semantic class uncertainty. For example, in one aspect, the disclosed observation system initially acquires sensor data from one or more sensors that perceive the surrounding environment. The sensor data includes representations of objects that are present within a field-of-view of the sensor. Thus, the disclosed system may identify objects from the sensor data, such as a vehicle, a pedestrian, or another object. The observation system classifies the object and, as part of classifying the object as belonging to a semantic class, produces an output that indicates probabilities of the object belonging to known semantic classes. This is the semantic class uncertainty.

Thus, instead of simply using the class having the highest probability of correspondence with the object, the observation system considers multiple different classes as the category probabilities. Accordingly, the observation system uses the category probabilities as an input to a forecasting model that conditions output trajectories on category probabilities. The forecasting model may be a machine learning algorithm or a combination of machine learning algorithms that uses the sensor data along with the category probabilities to produce multiple different trajectories as an electronic output. The separate output trajectories correspond with different semantic classifications for the object. The observation system may also produce multiple trajectories for a given semantic class to account for different maneuvers that an object of a particular semantic class may perform.

Furthermore, the observation system can then provide the trajectories to a planner in order to support path planning of a device associated with the observation system itself, or the observation system may perform the planning directly. In any case, the observation system improves the ability to account for different outcomes due to the uncertain semantic class of an object, thereby improving safety overall.

In one embodiment, an observation system for improving trajectory forecasting in a device is disclosed. The observation system includes one or more processors and a memory communicably coupled to the one or more processors. The memory storing a detection module including instructions that, when executed by the one or more processors, cause the one or more processors to, in response to receiving sensor data about a surrounding environment of the device, identify an object from the sensor data that is present in the surrounding environment. The detection module includes instructions to determine category probabilities for the object, the category probabilities indicating semantic classes for classifying the object and probabilities that the object belongs to the semantic classes. The memory stores a reference module including instructions that, when executed by the one or more processors, cause the one or more processors to forecast trajectories for the object based, at least in part, on the category probabilities and the sensor data. The reference module includes instructions to control the device according to the trajectories.

In one embodiment, a non-transitory computer-readable medium for improving trajectory forecasting in a device is disclosed. The non-transitory computer-readable medium including instructions that, when executed by one or more processors, cause the one or more processors to perform various functions. The instructions include instructions to, in response to receiving sensor data about a surrounding environment of the device, identify an object from the sensor data that is present in the surrounding environment. The instructions include instructions to determine category probabilities for the object, the category probabilities indicating semantic classes for classifying the object and probabilities that the object belongs to the semantic classes. The instructions include instructions to forecast trajectories for the object based, at least in part, on the category probabilities and the sensor data. The instructions include instructions to control the device according to the trajectories.

In one embodiment, a method of improving trajectory forecasting in a device is disclosed. In one embodiment, the method includes, in response to receiving sensor data about a surrounding environment of the device, identifying an object from the sensor data that is present in the surrounding environment. The method includes determining category probabilities for the object, the category probabilities indicating semantic classes for classifying the object and probabilities that the object belongs to the semantic classes. The method includes forecasting trajectories for the object based, at least in part, on the category probabilities and the sensor data. The method includes controlling the device according to the trajectories.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with an improved approach to forecasting trajectories for a detected object having an uncertain semantic class are disclosed. As previously noted, accurately representing objects detected in a surrounding environment can be a difficult task. For example, a classification may be based on whichever class within a defined ontology most closely corresponds to an object. This determination may fail to account for similarities between classes and other factors that may lead to a classification that is misleading. Consequently, this form of hard coding can result in incorrectly classifying an object. That is, when a device analyzes the sensor data to identify and classify an object, the result is generally a set of probabilities that indicate how closely the object corresponds with different semantic classes (e.g., bike, moving car, motorcycle, truck, parked car, etc.). In various circumstances, the confidence of the detection/classification may be lower due to various environmental circumstances. In any case, multiple separate categories for the semantic classes may indicate similar probabilities. In a hard decision approach, the device may accept the semantic class with the highest probability as the class of the object. However, as noted, this can lead to inaccurate forecasts of a trajectory for the object that may result in the device not being able to adequately plan for likely movements of the object.

Therefore, in one embodiment, an observation system is disclosed that improves the trajectory forecasting for objects by accounting for semantic class uncertainty. For example, in one aspect, the disclosed observation system initially acquires sensor data from one or more sensors that perceive the surrounding environment. The sensor data includes representations of objects that are present within a field-of-view of the sensor. Thus, the disclosed system may identify objects from the sensor data, such as a vehicle, a pedestrian, or another object. The observation system classifies the object and, as part of classifying the object as belonging to a semantic class, produces an output that indicates probabilities of the object belonging to known semantic classes. This is the semantic class uncertainty.

Thus, instead of simply using the class having the highest probability of correspondence with the object, the observation system considers multiple different classes as the category probabilities. Accordingly, the observation system uses the category probabilities as an input to a forecasting model that conditions output trajectories on category probabilities. The forecasting model may be a machine learning algorithm or a combination of machine learning algorithms that uses the sensor data along with the category probabilities to produce multiple different trajectories as an electronic output. The separate output trajectories correspond with different semantic classes for the object. The observation system may also produce multiple trajectories for a given semantic class to account for different maneuvers that an object of a particular semantic class may perform.

Furthermore, the observation system can then provide the trajectories to a planner in order to support path planning of a device associated with the observation system itself or the observation system may perform the planning directly. In any case, the observation system improves the ability to account for different outcomes due to the uncertain semantic class of an object, thereby improving safety overall.

Figure 1:
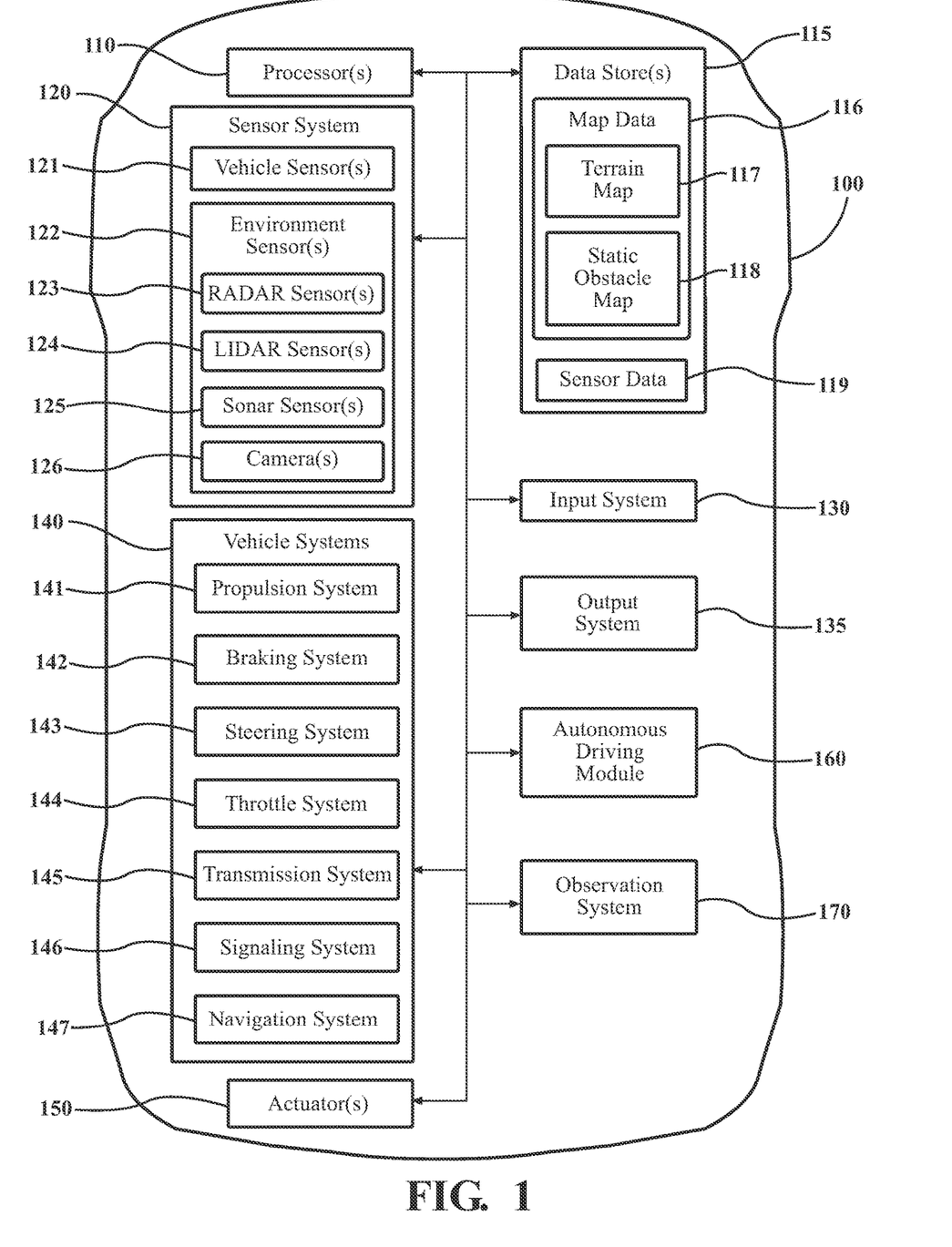
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles but are generally described in relation to automobiles for purposes of description. In yet further embodiments, the vehicle 100 may instead be a statically mounted device (e.g., at an intersection), an embedded device, a smartphone, or another device that predicts trajectories of perceived objects and, thus, benefits from the disclosed approach.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes an observation system 170 that functions to process sensor data into observations about a surrounding environment and objects therein from which the observation system 170 generates predicted future trajectories. Moreover, while depicted as a stand-alone component, in one or more embodiments, the observation system 170 is integrated with the autonomous driving module 160, or another component of the vehicle 100. The noted functions and methods will become more apparent with a further discussion of the figures.

Figure 2:
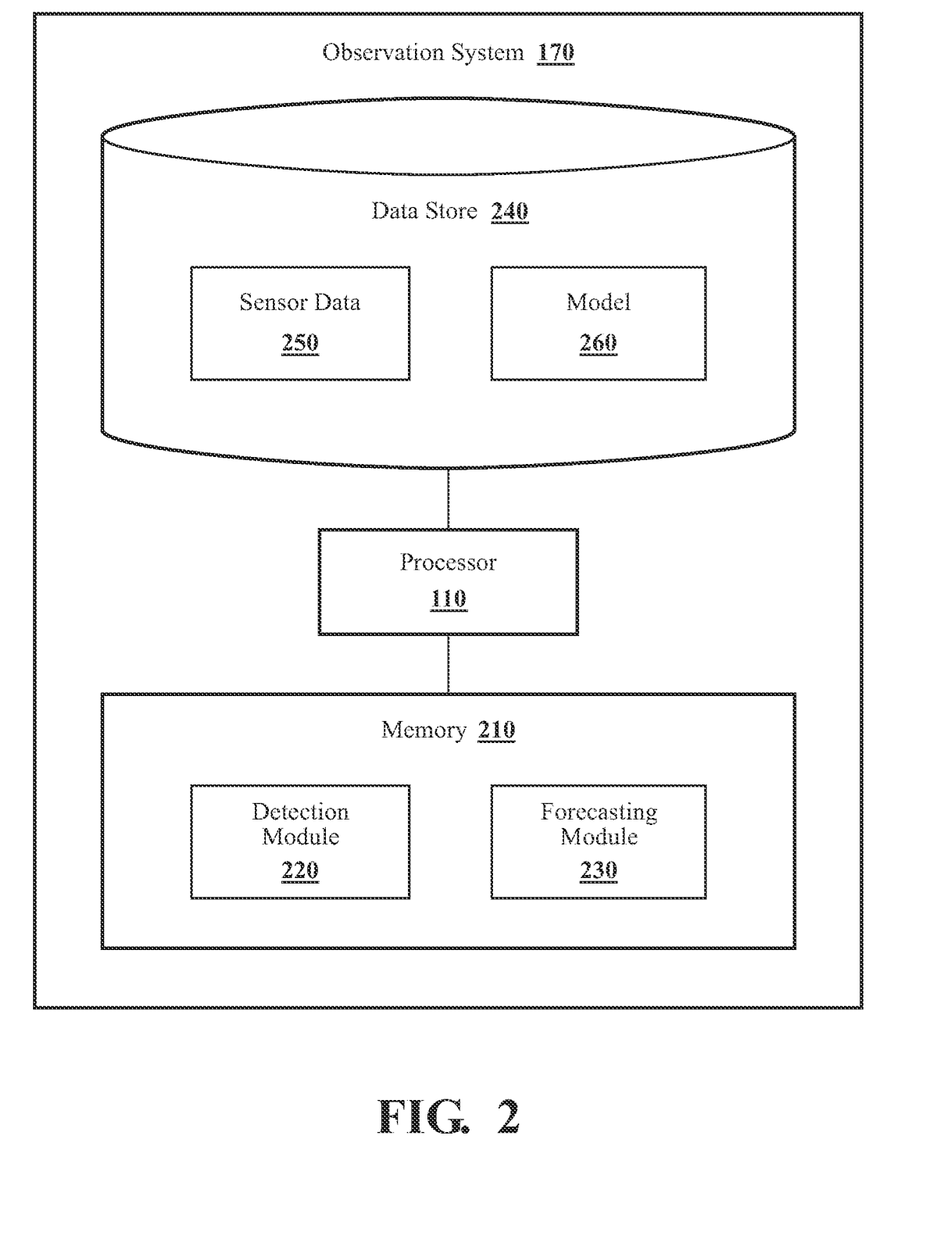
FIG. 2 illustrates one embodiment of an observation system that is associated with forecasting trajectories according to semantic categories associated with an object.

With reference to FIG. 2, one embodiment of the observation system 170 is further illustrated. The observation system 170 is shown as including a processor 110. Accordingly, the processor 110 may be a part of the observation system 170, or the observation system 170 may access the processor 110 through a data bus or another communication path. In one or more embodiments, the processor 110 is an application-specific integrated circuit (ASIC) that is configured to implement functions associated with a detection module 220 and a forecasting module 230.

In general, the processor 110 is an electronic processor, such as a microprocessor, that is capable of performing various functions as described herein. In one embodiment, the observation system 170 includes a memory 210 that stores the detection module 220 and the forecasting module 230. The memory 210 is a random-access memory (RAM), read-only memory (ROM), a hard disk drive, a flash memory, or other suitable memory for storing the modules 220 and 230. The modules 220 and 230 are, in at least one arrangement, computer-readable instructions that, when executed by the processor 110, cause the processor 110 to perform the various functions disclosed herein. As such, in one or more aspects, the modules 220 and 230 impart structure to the observation system 170 in the form of the instructions stored in the memory 210, associations with the structure of the processor 110, and the structure of algorithms implemented by the modules 220 and 230.

Furthermore, in one embodiment, the observation system 170 includes a data store 240. The data store 240 is, in one embodiment, an electronic data structure stored in the memory 210 or another electronic storage, and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, and a forecasting model 260 along with, for example, other information that is used by the modules 220 and 230.

Accordingly, the detection module 220, in one embodiment, controls the one or more respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In general, the sensor data 250 includes information about a surrounding environment from the one or more sensors that acquire the sensor data 250. That is, the sensor data 250 includes perceptions generated by the one or more sensors within a field-of-view of the sensor(s) making the perception. Thus, the sensor data 250 includes observations of the surrounding environment that depend on the field-of-view of the sensor and placement of the sensor in the environment. Within the context of the vehicle 100, the sensor data 250 may include observations of surrounding vehicles, lane markings, pedestrians, curbs, buildings, traffic signs, and so on. Of course, within other contexts (e.g., indoor), the observations embodied within the sensor data 250 may differ. It should be appreciated that the areas perceived by the sensor(s) may encompass 360 degrees about the vehicle 100 or a narrower perspective. In any case, the sensor data 250 includes information about the surrounding environment of a perceiving sensor.

The sensor data 250 itself can include a single form of data (e.g., a point cloud) or a combination of different data, such as images, radar returns, point clouds, and so on. The sensors may include a LiDAR, a radar, a camera, a sonar, or another sensor. In yet a further aspect, the detection module 220, the autonomous driving module 160, or another component may derive additional information from the sensor data 250.

With further reference to FIG. 2, the observation system 170 further includes the model 260. In one or more arrangements, the model 260 performs one or more of instance segmentation, classification, and trajectory forecasting. In any case, the model 260 functions to identify discrete objects present in a scene and predict trajectories of the objects according to at least category probabilities that indicate an extent of correspondence between an object and a set of semantic classes. It should be appreciated that the model 260 may be formed of multiple separate models that, when executed in a collaborative manner, function to perform the noted functions.

Figure 3:
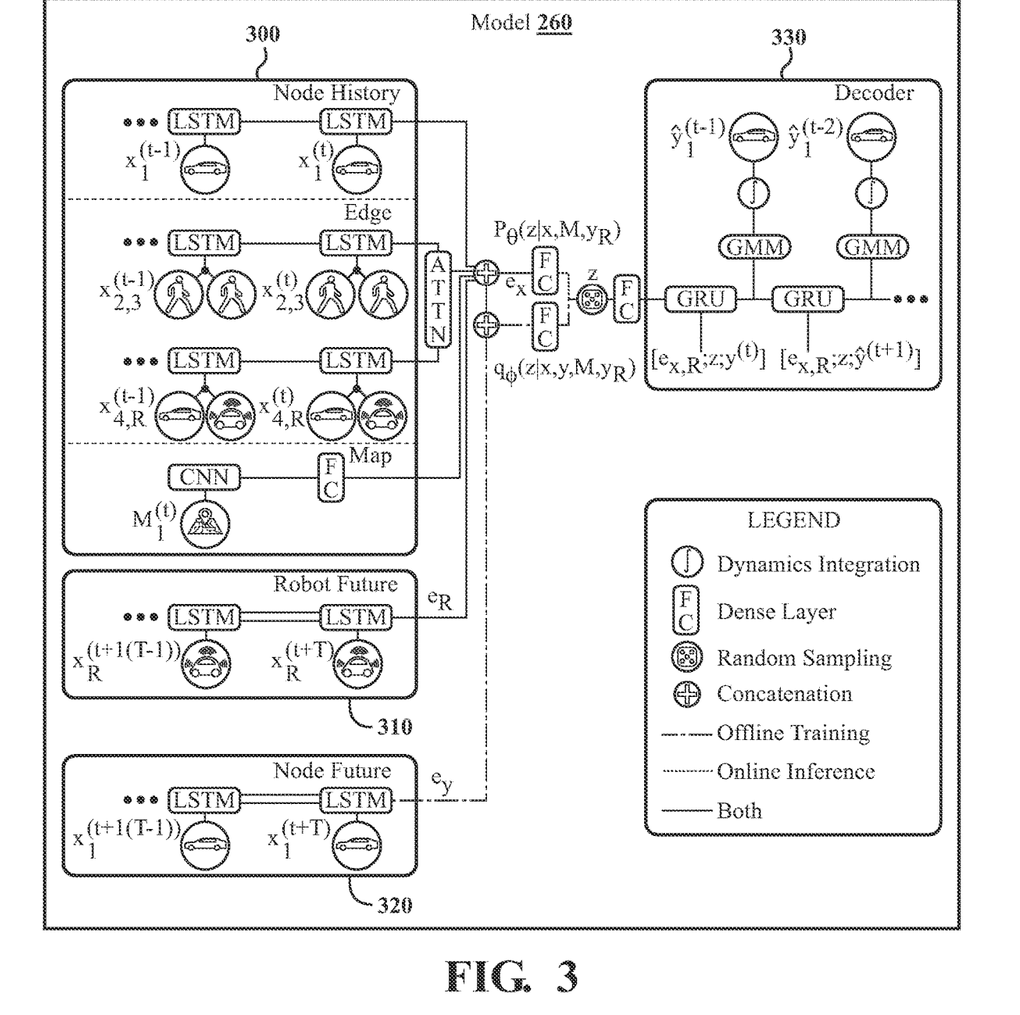
FIG. 3 is a diagram illustrating one implementation of a forecasting model.

In various approaches, the model 260 is a machine learning algorithm. As an additional explanation of one embodiment of the model 260, consider FIG. 3. FIG. 3 illustrates a view of one implementation of the model 260. In one embodiment, the model 260 accounts for heterogeneous data from multiple sources in the form of the sensor data 250. Thus, in at least one arrangement, the model 260 accounts for each agent (observed object) at multiple different points in time. The model 260 may accept semantic information in the form of geometric semantic maps, which may take the form of simple obstacle occupancy grids to multiple layers of annotated semantic information (e.g., sidewalks, road boundaries, crosswalks, etc.). The model 260 may further condition the provided trajectories on ego-motion (i.e., planned motion of the vehicle 100).

In any case, the model 260 incorporates the category probabilities as, for example, input vectors to block 300 in order to specify the different semantic classes for which the separate objects are to be considered. In a separate approach, the model 260 conditions on the semantic probabilities for each object at block 330 as a modification to the output. At a high level, the model 260 creates a spatiotemporal graph as a representation of the scene (i.e., the surrounding environment). The model 260 further structures a deep learning architecture according to the graph and forecasts the evolution of nodes attributes to produce agent trajectories (i.e., trajectories for identified objects).

In regards to the spatiotemporal graph, nodes in the graph represent agents and edges represent interactions therebetween. Each separate node corresponds with an identified object having category probabilities for a set of classes. The number of classes may vary depending on the implementation but generally corresponds with an ontology on which the classification aspect of the model 260 is trained. Thus, the model 260 may accept a vector including a full listing of probabilities for how a given object corresponds to the different classes and indicates results for all of the classes. Alternatively, the system 170, either directly or via the model 260, uses the classes that are above a threshold value. That is, for example, the system 170 may define a threshold probability for which the model 260 will consider different classes of an object. The system 170 may set the threshold at 50%, 60% or another probability that is determined to be suitable. In this way, the system 170 may still provide forecasts for multiple different classes associated with an object while still conserving computing resources by disregarding classes that are not likely associated with the object.

Continuing with the description of the model 260, once the graph of the scene is available, the model 260 encodes a current state (e.g., position and velocity) of the separate nodes along with a history (e.g., past positions and velocities) of each node and how each node is influenced by neighbors. The model 260 may implement Long Short-Term memory (LS™) networks with thirty-two hidden dimensions to achieve this. This may include using separate networks for each separate class for which the model 260 is forecasting a trajectory of an object to account for specifics of the semantic class. Moreover, in at least one approach, to model the influence of neighboring objects/agents on a modeled agent, the model 260 encodes graph edges in two steps. For example, first the model 260 aggregates edge information from neighboring agents of a same semantic class. The model 260 may then feed the aggregated states into an LSTM. Thereafter, the model 260 generates an influence representation vector from all edge types that connect with the modeled node to represent the effect of all neighboring nodes. Of course, where a particular semantic class of a neighboring agent corresponds with multiple different possibilities, the model 260 may execute separate iterations to provide different forecasts.

At block 310, the model 260 encodes ego-agent motion plans. In particular, in one or more configurations, the model 260 produces predictions that take into account future ego-agent motion. The model 260 provides for evaluating a set of motion primitives with respect to possible response from other agents using a bi-directional LSTM network. Additionally, in at least one arrangement, the model 260 handles multimodality by leveraging a conditional variational auto-encoder (CVAE) to produce target distributions introducing a categorical latent variable encoding latent behavior.

At block 320, the model 260 produces predictions that take into account future ego-agent motion (i.e., motion of the vehicle 100). In particular, in at least one arrangement, the model 260 evaluates a set of motion primitives with respect to possible responses from other agents (i.e., identified objects in the surrounding environment). The model 260 can encode future timesteps T of a motion plan of the vehicle 100 using, for example, a bi-directional LSTM with 32 hidden dimensions. The model 260 then concatenates the final hidden states into representative vectors fed into subsequent stages.

At block 330, the model 260 decodes the previously encoded variables to produce trajectories according to the separate category probabilities. For example, in one approach, the model 260 acquires the previously generated variables and processes the information using a gated recurrent unit (GRU). Separate cells of the GRU outputs parameters of a bivariate Gaussian distribution over control actions (e.g., acceleration and steering rate). The model 260 then integrates the system dynamics with the produced control actions to obtain trajectories.

Figure 4:
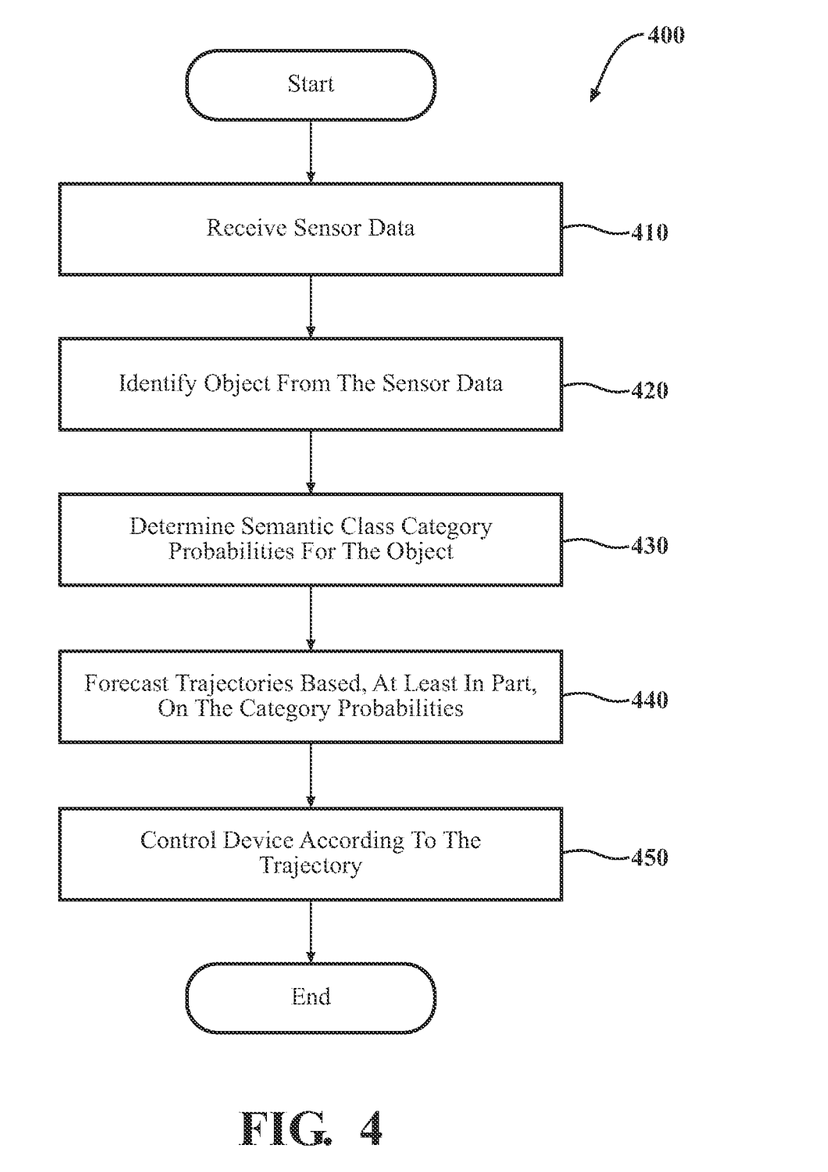
FIG. 4 is a flowchart of one embodiment of a method associated with forecasting trajectories for objects in a surrounding environment of a device.

Additional aspects of generating trajectories according to semantic uncertainty of objects will be discussed in relation to FIG. 4. FIG. 4 illustrates a flowchart of a method 400 that is associated with forecasting trajectories. Method 400 will be discussed from the perspective of the observation system 170 of FIGS. 1-2. While method 400 is discussed in combination with the observation system 170, it should be appreciated that the method 400 is not limited to being implemented within the observation system 170 but is instead one example of a system that may implement the method 400.

At 410, the detection module 220 acquires the sensor data 250. In one embodiment, the detection module 220 acquires the sensor data 250 locally from co-located systems with the observation system 170 (e.g., the camera 126), while in further embodiments, the detection module 220 may acquire the sensor data 250 through a communication link with a remote system. Thus, while the observation system 170 can be implemented within a particular device that is, for example, actively navigating an environment, the observation system 170 may also function as a cloud-based computing service to analyze the sensor data 250. As previously described, the sensor data 250 itself may have different characteristics according to different implementations but generally includes observations of a surrounding environment from which objects may be identified.

At 420, the detection module 220 identifies at least one object from the sensor data 250. As previously described, the detection module 220 may segment the object from the sensor data 250 using a segmentation model to provide segmented data representing individual objects in the surrounding environment. Of course, in further implementations, the detection module 220 may implement other routines or models to generate the segmented data. In any case, the detection module 220 generally functions to acquire the sensor data 250 and derive observations of objects therefrom. Thus, the detection module 220 performs various functions to facilitate the derivation of observations about the surrounding environment from which further determinations may be performed. It should be appreciated that the detection module 220 may use observations about the objects to track the objects and generate a history of locations and velocities for the respective objects, which the forecasting module 230 may use in determining trajectories. Thus, while a single instance of identifying and deriving information is discussed, in general, the detection module 220 may iteratively perform the functions discussed at block 420.

At 430, the detection module 220 determines the semantic class category probabilities for the object. The detection module 220 generally functions to at least, in one or more approaches, generate the category probabilities for the object. That is, the detection module 220 may execute a semantic classification model that is part of the model 260. The semantic classification model may be a convolutional neural network (CNN) or similar machine learning algorithm that determines the extent to which an object corresponds to different semantic classes on which the model has been trained. Thus, the output of the semantic classification model is, in one approach, a vector of probabilities that correspond to the separate semantic classes for the object. The separate probabilities represent the confidence that the object belongs to the separate classes. Thus, due to various circumstances, the output may provide relatively high values for multiple different semantic classes. This circumstance may be most common between classes having similar properties, such as bicycles and motorcycles, stationary versus moving vehicles, and so on. In any case, because an output vector may indicate correspondence for the object belonging to multiple different possible semantic classes, which exhibit distinct dynamic behaviors, the model 260 is configured to forecast trajectories for the multiple different outcomes.

At 440, the forecasting module 230 forecasts trajectories for the object based, at least in part, on the category probabilities and the sensor data 250. In one or more arrangements, the model 260 is conditioning the trajectories on the category probabilities by accounting for the separate categories to which the object may belong in producing the trajectories. Thus, the forecasting module 230 is producing separate predicted future paths of the object that correspond to the object being assigned to separate ones of the semantic classes. As such, the forecasting module 230 is able to provide a set of trajectories that account for multiple different classifications of the object in order to avoid circumstances of incorrect classifications that leave the vehicle 100 without appropriate knowledge for planning. Furthermore, as specified previously, the forecasting module 230 may integrate the category probabilities in different ways into the model 260 (i.e., at different functional blocks, such as 300 versus 330). In any case, the forecasting model 260 forecasts multiple trajectories for a given object that indicate potential future paths.

At 450, the forecasting module 230 controls the device (e.g., the vehicle 100) according to the trajectories. For example, the forecasting module 230 may analyze the trajectories using a planner to determine a planned trajectory of the device and a contingent trajectory for controlling the device that accounts for the multiple different trajectories of the object. The planned trajectory may represent a most likely trajectory for the device to follow, whereas the contingent trajectory may represent trajectories that account for less likely maneuvers of the objects in the surrounding environment. In either case, because the forecasting module 230 generates multiple trajectories for the various objects, the forecasting module 230 can better plan for contingencies and thereby improve safety. In this way, the observation system 170 can improve operation of an associated device, such as the vehicle 100, by improving awareness about objects and accounting for inaccuracies in machine perceptions.

Figure 5:
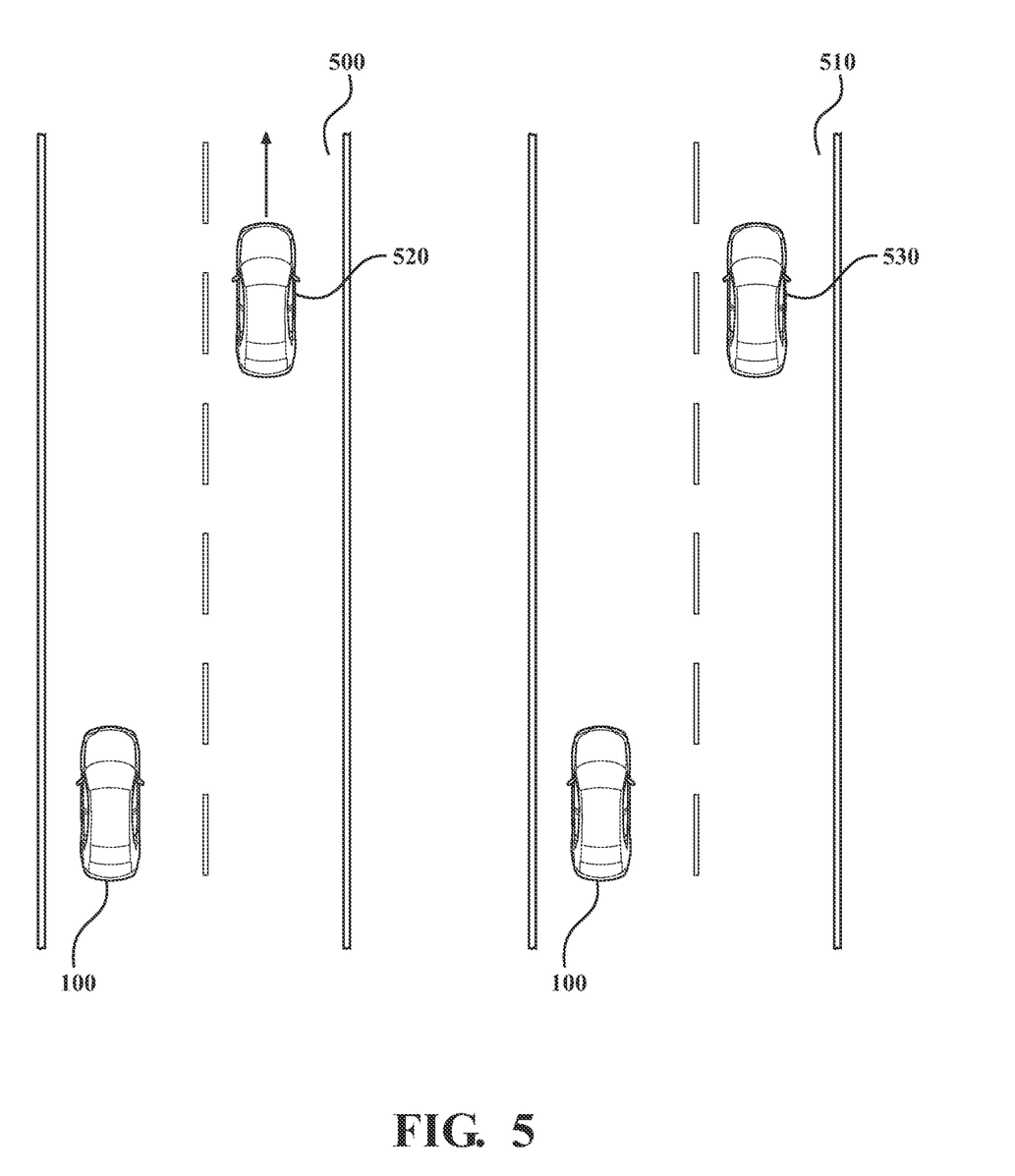
FIG. 5 illustrates a diagram of one example scenario of forecasting a trajectory for an object with an uncertain semantic class.
Figure 6:
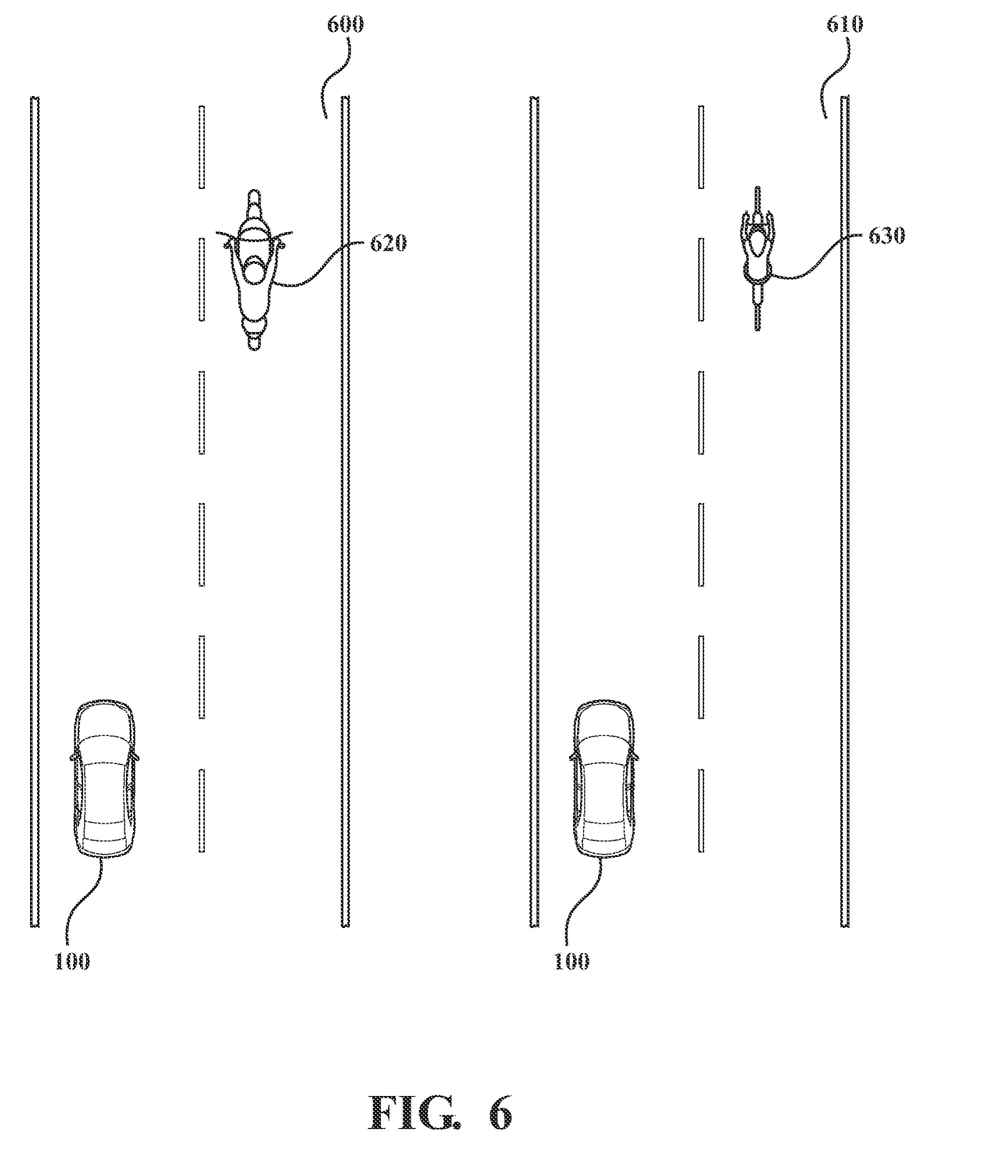
FIG. 6 illustrates a diagram of one example scenario of forecasting a trajectory for an object with an uncertain semantic class.

Further explanation of how the observation system 170 forecasts trajectories according to semantic uncertainties will be described in relation to examples that are illustrated in FIGS. 5-6. FIG. 5 illustrates an example of two separate scenarios 500 and 510. In scenario 500, the vehicle 100 detects an object that is a vehicle 520 and classifies the object as a moving vehicle. By contrast, in the scenario 510, the vehicle 100 detects the vehicle 530 and classifies the vehicle 530 as a stationary vehicle. The moving vehicle and the stationary vehicle represent separate semantic classifications. Thus, the vehicle 100 would forecast trajectories for the vehicle 520 and the vehicle 530 quite differently if accounting for only the original hard-coded classification. However, with a soft-decision value that provides both possible classifications to the model 260, the model 260 may better forecast a range of movements for the vehicle 520/530, which then provides for better planning on the part of the vehicle 100 because of the improved knowledge. Specifically, in the instance of the stationary vehicle 530, the vehicle 100 may further consider potential movements of a moving vehicle that would otherwise be disregarded.

FIG. 6 illustrates an example of two separate scenarios 600 and 610. In scenario 600, the vehicle 100 detects a motorcycle 620. By contrast, in the scenario 610, the vehicle 100 detects the bicycle 630. The motorcycle 620 and the bicycle 630 represent separate semantic classifications. Thus, the vehicle 100 would forecast trajectories for 620 and 630 differently if accounting for only the hard-coded classification. In any case, it should be apparent that classification of the two separate objects 620 and 630 could closely correspond to the same identified object because of the similarities. Thus, if a class with a higher probability incorrectly identifies the object, then the vehicle 100 may incorrectly plan for movements of the object 620/630. However, with a soft-decision value that provides both possible classifications to the model 260, the model 260 may better forecast a range of movements associated with classifying an object as both the motorcycle 620 and the bicycle 630, which then provides for better planning on the part of the vehicle 100 because of the improved knowledge.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the observation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the observation system 170, and/or the autonomous driving module(s) 160 may control some or all of these vehicle systems 140 and, thus, may be partially or fully autonomous.

The processor(s) 110, the observation system 170, and/or the autonomous driving module(s) 160 can be operatively connected to communicate with the various vehicle systems 140 and/or individual components thereof. For example, returning to FIG. 1, the processor(s) 110, the observation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the observation system 170, and/or the autonomous driving module(s) 160 may control some or all of these vehicle systems 140.

The processor(s) 110, the observation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the observation system 170, and/or the autonomous driving module(s) 160 can control the direction and/or speed of the vehicle 100. The processor(s) 110, the observation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the observation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An observation system for improving trajectory forecasting in a device, comprising:
   one or more processors;
   a memory communicably coupled to the one or more processors and storing:
   a detection module including instructions that, when executed by the one or more processors, cause the one or more processors to, in response to receiving sensor data about a surrounding environment of the device, identify an object from the sensor data that is present in the surrounding environment, and
   wherein the detection module includes instructions to determine category probabilities for the object, the category probabilities indicating semantic classes for classifying the object according to an object type and probabilities that the object belongs to the semantic classes; and
   a reference module including instructions that, when executed by the one or more processors, cause the one or more processors to forecast trajectories for the object according to the category probabilities and the sensor data, the trajectories are separate predicted future paths of the object that correspond to the object being assigned to separate ones of the semantic classes, including instructions to forecast multiple different trajectories for the object according to different ones of the semantic classes and different maneuvers for individual ones of the semantic classes, and for different ones of the semantic classes with probabilities above a defined threshold that is nonzero and sufficient to indicate a likely presence of the semantic classes, and control the device according to the trajectories.

2. The observation system of claim 1, wherein the reference module includes instructions to forecast the trajectories for the object including instructions to forecast the trajectories according to the object being classified as separate instances of the semantic classes.

3. The observation system of claim 1, wherein the reference module includes instructions to forecast the trajectories including instructions to provide multiple different trajectories for the object according to different ones of the semantic classes.

4. The observation system of claim 1, wherein the reference module includes instructions to forecast the trajectories including instructions to generate the trajectories using a graph-structure recurrent model.

5. The observation system of claim 1, wherein the detection module includes instructions to determine the category probabilities including instructions to analyze the sensor data according to a semantic model that performs semantic segmentation.

6. The observation system of claim 1, wherein the trajectories are future predicted paths of the object according to the semantic classes.

7. The observation system of claim 1, wherein the reference module includes instructions to control the device including instructions to analyze the trajectories by a planner to determine a planned trajectory of the device and a contingent trajectory for controlling the device that accounts for the trajectories of the object.

8. A non-transitory computer-readable medium for improving trajectory forecasting in a device and including instructions that when executed by one or more processors cause the one or more processors to:
   in response to receiving sensor data about a surrounding environment of the device, identify an object from the sensor data that is present in the surrounding environment;
   determine category probabilities for the object, the category probabilities indicating semantic classes for classifying the object according to an object type and probabilities that the object belongs to the semantic classes;
   forecast trajectories for the object according to the category probabilities and the sensor data, the trajectories are separate predicted future paths of the object that correspond to the object being assigned to separate ones of the semantic classes, including instructions to forecast multiple different trajectories for the object according to different ones of the semantic classes and different maneuvers for individual ones of the semantic classes, and for different ones of the semantic classes with probabilities above a defined threshold that is nonzero and sufficient to indicate a likely presence of the semantic classes; and
   control the device according to the trajectories.

9. The non-transitory computer-readable medium of claim 8, wherein the instructions to forecast the trajectories for the object include instructions to forecast the trajectories according to the object being classified as separate instances of the semantic classes.

10. The non-transitory computer-readable medium of claim 8, wherein the instructions to forecast the trajectories include instructions to provide multiple different trajectories for the object according to different ones of the semantic classes.

11. The non-transitory computer-readable medium of claim 8, wherein the instructions to forecast the trajectories including instructions to generate the trajectories using a graph-structure recurrent model.

12. The non-transitory computer-readable medium of claim 8, wherein the instructions to determine the category probabilities include instructions to analyze the sensor data according to a semantic model that performs semantic segmentation.

13. The non-transitory computer-readable medium of claim 8, wherein the trajectories are future predicted paths of the object according to the semantic classes.

14. A method, comprising:
- in response to receiving sensor data about a surrounding environment of a device, identifying an object from the sensor data that is present in the surrounding environment;
- determining category probabilities for the object, the category probabilities indicating semantic classes for classifying the object according to an object type and probabilities that the object belongs to the semantic classes;
- forecasting trajectories for the object according to the category probabilities and the sensor data, the trajectories are separate predicted future paths of the object that correspond to the object being assigned to separate ones of the semantic classes, including forecasting multiple different trajectories for the object according to different ones of the semantic classes and different maneuvers for individual ones of the semantic classes, and for different ones of the semantic classes with probabilities above a defined threshold that is nonzero and sufficient to indicate a likely presence of the semantic classes; and
- controlling the device according to the trajectories.

15. The method of claim 14, wherein forecasting the trajectories for the object includes forecasting the trajectories according to the object being classified as separate instances of the semantic classes.

16. The method of claim 14, wherein forecasting the trajectories includes modeling influence of neighboring agents on the object by aggregating edge information from the neighboring agents of a given semantic class and generating an influence representation vector for neighboring agents on the object to represent an effect of the neighboring agents.

17. The method of claim 14, wherein forecasting the trajectories includes generating the trajectories using a graph-structure recurrent model,
- wherein identifying the object in the surrounding environment includes creating a spatiotemporal graph as a representation of the object in the surrounding environment with nodes of the spatiotemporal graph representing objects and current states of the objects including the object and edges representing interactions of the objects.

18. The method of claim 14, wherein determining the category probabilities includes analyzing the sensor data according to a semantic model that performs semantic segmentation.

19. The method of claim 14, wherein the trajectories are future predicted paths of the object according to the semantic classes.

20. The method of claim 14, wherein controlling the device includes analyzing the trajectories by a planner to determine a planned trajectory of the device and a contingent trajectory for controlling the device that accounts for the trajectories of the object.

* * * * *